Feb. 24, 1959 E. B. SARGENT 2,874,414
MOLD FOR MOLDING TELEPHONE HANDSETS
Filed April 2, 1956 4 Sheets-Sheet 1

INVENTOR.
EDMUND B. SARGENT
BY
ATTY.

Feb. 24, 1959 E. B. SARGENT 2,874,414
MOLD FOR MOLDING TELEPHONE HANDSETS
Filed April 2, 1956

INVENTOR.
EDMUND B. SARGENT
BY
ATTY.

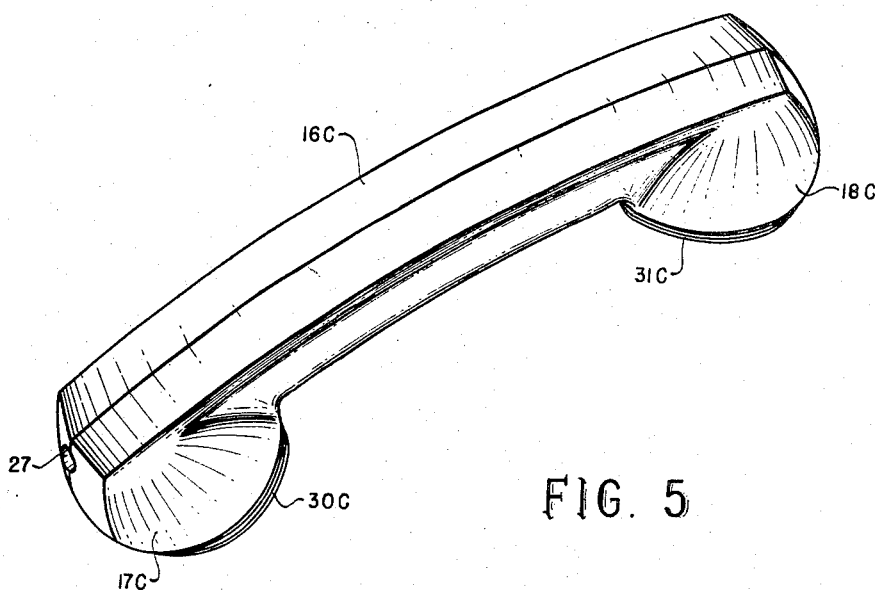

United States Patent Office 2,874,414
Patented Feb. 24, 1959

2,874,414

MOLD FOR MOLDING TELEPHONE HANDSETS

Edmund B. Sargent, Chicago, Ill., assignor to General Telephone Laboratories, Incorporated, a corporation of Delaware Application April 2, 1956, Serial No. 575,558

6 Claims. (Cl. 18—42)

This invention relates to the molding of plastics and has particular relation to the molding of telephone handsets from plastics such as tenite which become insoluble and infusible when under intense heat and pressure.

A telephone handset comprises a handle having a transmitter at one end and a receiver at the other end. The handle is shaped to fit the hand and the transmitter and receiver portions of the set each extend from the handle at angles thereto for convenience in use.

Heretofore telephone handsets have been made from phenol formaldehyde resins by compression of the molding material in heated molds. A high degree of pressure must be applied to the molds to compress the material into the mold cavities and to produce articles of the desired density.

While most of the telephone sets heretofore produced have been made by compression molding this method has several disadvantages.

The principal objection to the prior method of compression molding is that a flash line must be formed on the set at the parting line of the mold or die in order to permit the escape of excess molding to insure filling of the mold cavity and to obtain the desired density in the article. This flash has to be removed by a grinding or machining operation which cuts through the surface layer or coating on the set. The surface layer or coating has a high gloss or finish which is desirable for appearance and durability and when the flash is removed by grinding or cutting, a dull surface is left of undesirable appearance and which becomes more unsightly after the handset has been in use, especially because of the effect of perspiration from the hands of the users.

A means of overcoming the mentioned disadvantage was by the use of "transfer molding." "Transfer molding," in the broader aspects, comprises subjecting a thermosetting molding compound to heat and pressure in a cylinder to render it fluent and then forcing the plastic through narrow passages into the cavities of a heated die under hydrostatic pressure to harden the plastic in the die and thus form a molded article.

A disadvantage encountered in "transfer molding" of telephone handsets is the location of the sprue or sprues, left at the opening or gate into the mold cavity, on the molded article. In most cases the sprue appears somewhere on the molded telephone handset, requiring the article to be ground or machined to remove this unsightly rough spot. Again, as in compression molding with its flash lines, the grinding or machining operations leave a dull surface thereafter, which is undesirable.

Another disadvantage of "transfer molding" of telephone handsets is that in forcing the molding compound into the cavity of a heated die to form the article, the die must be allowed to cool a certain length of time (generally about three minutes) to allow the compound to harden. In mass production of these articles this is definitely a drawback.

An objection to transfer molding of telephone handsets is that in providing for the cores forming the hollows of the article, including the portion forming the threads on the transmitter and receiver, when the set has been through the molding operation, the cores and thread forms must all be disassembled from the molded set. These cores and thread forming portions are sometimes screwed together, or even bolted together. The cores and thread forming portions thereafter must be cleaned and reassembled before reusing. This requires a certain amount of valuable time wasted between molding operations of each handset.

A newer means of overcoming the last-mentioned disadvantage is the adoption of "injection molding." "Injection molding" in the broader aspects, is the heating to a sufficiently plastic state of a compound in a heating chamber, and then by means of a plunger forcing it through an orifice into a relatively cold mold where the mold is formed and hardened upon cooling. The use of a relatively cold mold quickens the hardening of the compound.

It is an object of this invention to provide a novel means for molding telephone handsets by the employment of injection molding by means of which the above and other disadvantages are largely if not entirely overcome. The invention provides a highly glossed telephone handset requiring no grinding or machining operations and still permits the mass production of these articles at a rapid rate. This preserves intact the gloss of the outer layer of plastic at the parting line.

Another object of the invention is to have the material enter the mold at a point corresponding to that at which the cord for the telephone handset is to be inserted therein. Thus leaving the sprue at the point where the hole for the cord is to be drilled.

A further object of this invention is to provide a pressure controlled retractor assembly for inserting the cores for forming the interior of the transmitter and receiver shells, and retracting these cores after the molding operation.

A still further object of this invention is to provide a pair of tapered cores for forming the interior of the handle, whereby these cores are slidably mounted on the receiver and transmitter cores by means of a tongue and groove arrangement. A retractor assembly is provided for retracting said transmitter and receiver cores, whereby upon retraction thereof after the molding operation, these cores will slide out of their respective handle cores. The molded telephone handset will then merely be tapped on a hard surface, and the tapered handle cores will fall out.

Other objects and advantages of the invention will be pointed out in, or will become apparent from the detailed description of an embodiment of the invention illustrated in the accompanying drawings, wherein:

Fig. 5 is a perspective view of a telephone handset which may be made according ot the present invention.

Figure 1:
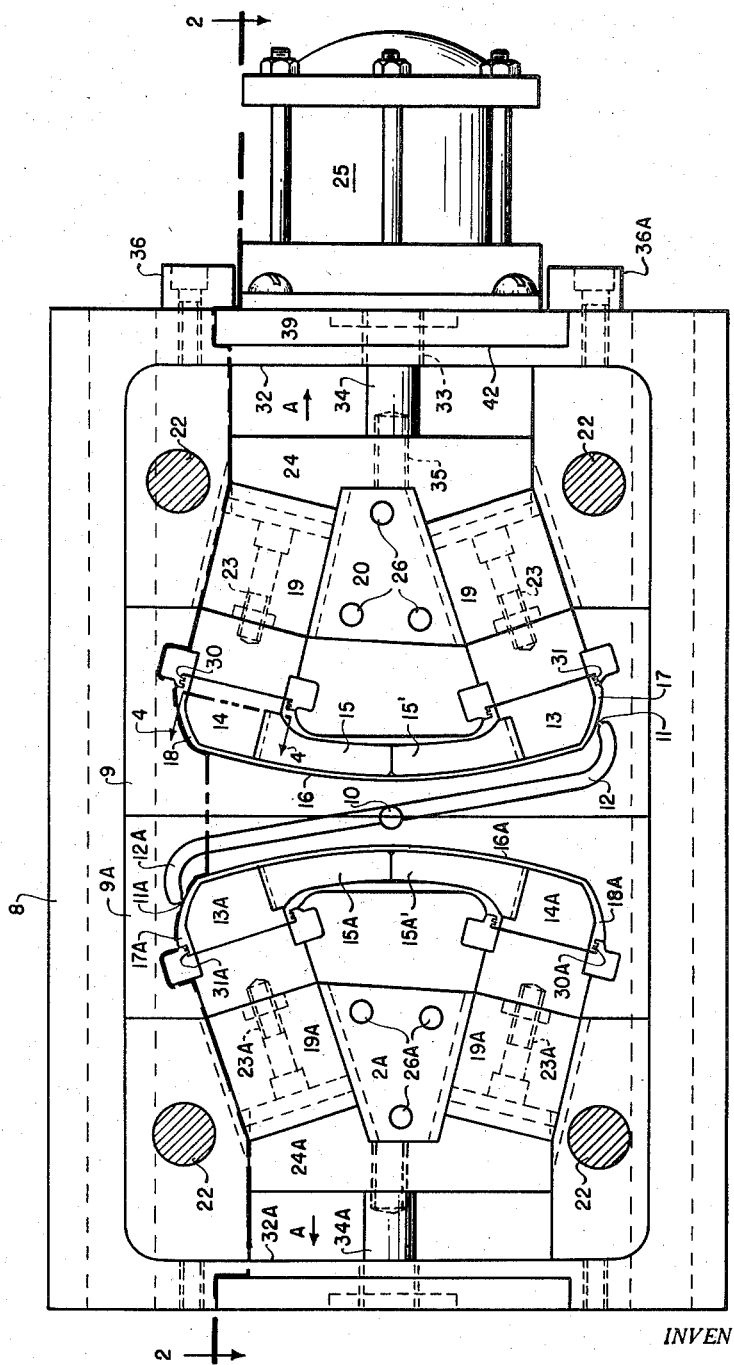
Fig. 1 is a front view of the back half of a die assembly including two halves of a mold assembly for carrying out the method with the retractor assembly in forward position.
Figure 2:
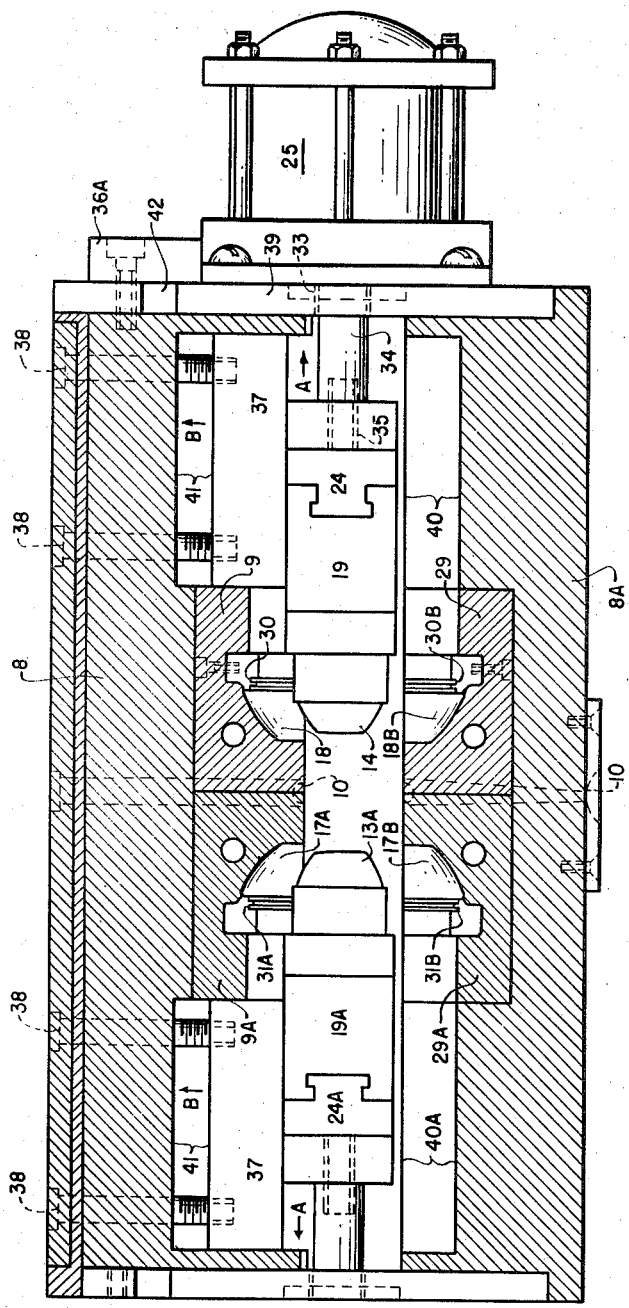
Fig. 2 is a sectional view taken in the direction of the arrows along line 2—2 of Fig. 1.

In molding telephone handsets according to the present invention, there is provided a die having the two halves indicated at 8 and 8A (Fig. 2). The half of the die 8A is the stationary half, and the die half 8 is the movable half, and the die comprises a pair of cavities which are so formed that two handsets may be molded when the die halves are held in vertical position. Associated with each half of the die 8 and 8A are the mold inserts 9 and 9A (Figs. 1, 2, and 3), and 29 and 29A (Fig. 2) which as a complete unit when compressed together form the cavities for two telephone handsets.

Figure 3:
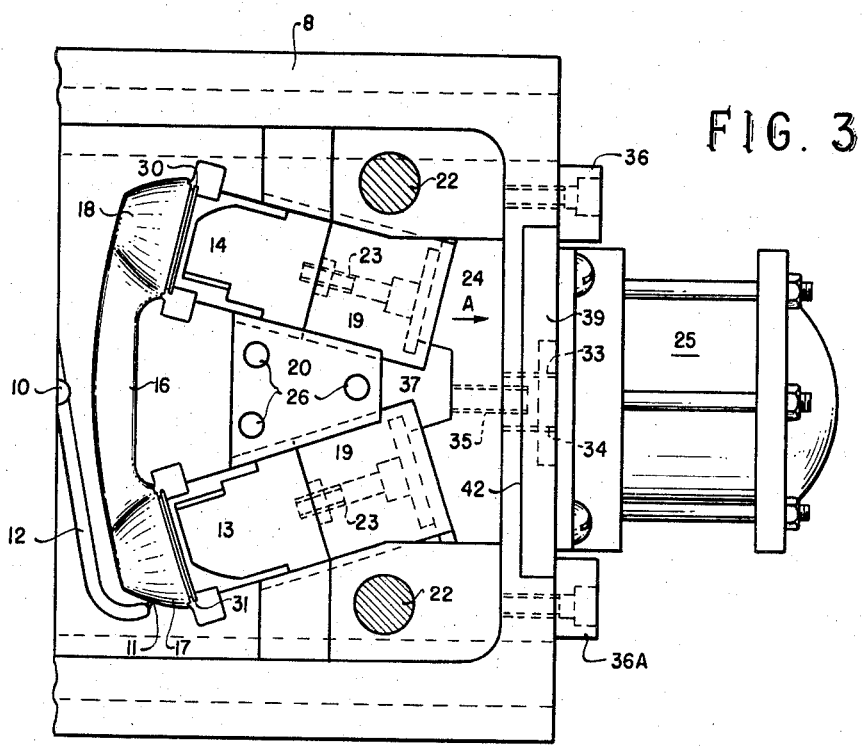
Fig. 3 is a front view of one half of a mold assembly, including the retractor assembly in its retracted position.

The mold cavities of die 8 formed in inserts 9 and 9A include the handle forming portions 16 and 16A, Figs. 1 and 3, receiver shell forming portions 18 and 18A, Figs. 1, 2, and 3, and transmitter shell forming portions 17 and 17A, Figs. 1, 2, and 3, and which shell forming portions are arranged at less than right angles to the handle forming portions 16 and 16A, as shown. There is also provided in the mentioned cavities, thread cavities 30 and 30A for the transmitter shells, and thread cavities 31 and 31A for the receiver shells. The axial center lines of portions 17, 17A, 18, and 18A lie in the plane of the parting line of the die.

The mold cavities of die half 8A are identical with die half 8. In Fig. 2, a portion of die half 8A is shown, having a transmitter shell forming portion 17B identical with transmitter shell forming portion 17A of die half 8, and receiver shell forming portion 18B identical with receiver shell forming portion 18 of die half 8. Also shown are thread cavities 31B and 30B which are identical with thread cavities 31A and 30 respectively.

As mentioned and as shown in Fig. 2, two halves of a telephone are molded from each half of the die, and naturally they are to be identical. However, on the compression of the molds 9A and 29A, this handset will be molded with its transmitter shell upward, and upon simultaneous compression of the molds 9 and 29, this handset will be molded with its transmitter shell downward. It is to be understood therefore that the component parts to be described associated with molds 9 and 29 will be identical with the component parts of molds 9A and 29A, except that they will be reversed. Thus, from this understanding, the ensuing description and explanation will be concentrated on only the component parts associated with molds 9 and 29, and more specifically, mold half 9.

A retractor assembly is associated with the molds, including an air cylinder 25. The retractor assembly includes an inverted C-shaped plate retractor 24, retractor slides 19, and transmitter and receiver cores 13 and 14. A pair of knockout pins 38 (Fig. 2) protruding through a pair of holes provided in the die half 8 are fastened to a retractor support 37, by a threaded hole and screw arrangement, as shown in Fig. 2. A tapered plate 20 is fastened to the retractor support 37 by means of three rivets or bolts 26, as shown in Figs. 1 and 3. The tapered plate 20 has two sloping edges along which a pair of retractor slides 19 are moved in a sliding motion. At one end of each retractor slide 19, two cores 13 and 14 are fastened to the retractor slide 19 by means of bolts 23 (Figs. 1 and 3). At the other ends of the retractor slide 19, the inverted C-shaped plate 24 is interlocked with the retractor slides by a tongue and groove arrangement to be described in the ensuing description. A cylinder rod 34 is fastened to the inverted C-shaped plate 24 by means of a threaded rod 35 screwed tightly into threaded holes provided in the cylinder rod 34 and plate 24. A bearing 33 is provided in the air cylinder 25 for movement therein of the cylinder rod 34.

Figure 4:
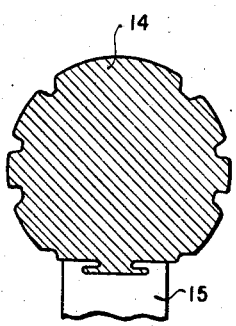
Fig. 4 is a cross sectional view of the interlocking core assembly taken along line 4—4 of Fig. 1.

The cores 13 and 14 can be positioned in mold cavities 17 and 18 respectively, to form the interiors of transmitter and receiver shells, or casings. As a complete unit, the retractor assembly forms a Y shape whereby the two extending arms move in oblique planes, and the other arm moves in a straight plane. The cores 13 and 14 have a tongue and groove arrangement for permitting manual sliding of a pair of tapered core inserts 15 and 15' thereon, as shown in Fig. 4. One of the core inserts 15' is attached to the transmitter core 13 and the other core 15 is attached to the receiver core 14, whereby their extending ends will be flush with each other (as shown in Figs. 1 and 3). The cores 15 and 15' are positioned in the handle forming portion 16 to form the interior of the handle shell, to thus provide an opening in the handset for inserting wires after completing the molding operation.

As shown in Figs. 1, 2 and 3, a sprue entrance 10 is provided for accepting the molten plastic into the mold. The sprue opening 10 leads into vertical runners 12 and 12A (Fig. 1) of each half of the molds, and into gates 11 and 11A respectively, each runner and gate being cut partly in each half of the die members. The gates 11 and 11A enter the mold cavities through a point on the transmitter cavities 17 and 17A which will form fillets thereat on the telephone handsets.

The molten plastic to be used is preferably tenite, which has a known characteristic for being capable of being pigmented and maintaining a color, and which is ideal for the present demand for colored handsets. It is to be understood however, that other plastics could be used without departing from the present invention.

As shown in Figs. 1, 2 and 3, guide pins 22 are provided and slidable within holes provided in the opposite die halves, for guiding the die halves, when compressed, to insure the cavities being aligned and flush with each other.

Referring back to the interlocking arrangement of the retractor slide 19 and the inverted C-shaped plate 24, attention is first directed to Fig. 2. In Fig. 2, the tongue and groove arrangement for linking the slide 19 and bar 24 is shown from a top view. When the air cylinder is pressurized, the cylinder rod forces the retractor assembly to maintain a position shown in Fig. 1. However, when the pressure is released, the retractor assembly will retract, whereby the retractor slides 19 will follow the edges of the tapered plate 20 and the plate 24 will move toward the air cylinder along a horizontal plane. During this retraction, there will be a sliding motion in the tongue and groove interlocking arrangement of the slide 19 and plate 24 to permit such movement.

In Fig. 2, the two die halves are shown in their normal inoperative position, although actually die half 8 would be moved further away from die half 8A to allow manual accessibility to the molds. In this normal position, the knockout pins 38 force the retractor assembly away from the cavities, as shown, to allow sliding the cores 15' and 15 onto the cores 13 and 14 respectively. When the die halves are compressed together, the die half 8A forces the retractor assembly into the opening 41, and thus forcing the knockout pins 38 to retract through the holes provided in the die 8.

As shown in Figs. 1, 2, and 3 the air cylinder 25 is bolted to a sliding member 39 which also carries the retractor assembly including member 24. The sliding member 39 is slidable within an opening 42 provided in the die halves. As shown in Fig. 2, the gap provided in opening 42 is of identical width as opening 41 provided for the retractor support 37. This gap permits the sliding member 39 to move the same distance in the direction of arrow B, as does the retractor support 37 during compression of the die halves. Upper and lower guide plates, 36 and 36A respectively, are provided for guiding the sliding member along the outer edges of the opening 42. The guide plates 36 and 36A are bolted to die half 8, whereby one of the longitudinal ends of each guide plate overlaps the sliding member 39 to hold the sliding member 39 within the opening 42 (as shown in Figs. 1 and 3). This permits lateral movement of the cylinder rod 34 and maintains alignment of the cylinder rod 34 with the bearing 33.

A detailed molding operation will now follow:

Assuming that the die is in its normal inoperative position, manual operation is exercised to pressurize the air cylinder 25 and a second air cylinder (not shown) associated with mold halves 9A and 29A, to project the retractor assemblies. The retractor slides 19 and 19A will slide and follow the beveled edges of the plates 20 and 20A respectively. The cores 13, 13A, 14, and 14A will thus extend adjacent their associated cavities. The cores 15, 15', 15A and 15A' will then, by means of their tongue and groove arrangement, be manually slid on their respective cores 13, 13A, 14, and 14A (as shown in Fig. 1).

A manual operation is then exercised to compress the die halves together. Upon die half 8A making contact with the retractor assemblies within openings 40 and 40A, pressure is applied against the retractor assemblies and supports 37 to push the knockout pins 38 outward, and the slide member 39 slides within opening 42 (in the direction of the arrows B). The cores 13, 13A, 14, and 14A are now lying in the center of their respective transmitter and receiver cavities 17, 17A, 18, and 18A, and the cores 15, 15', 15A and 15A' are now lying in the center of the handle forming cavities 16 and 16A. After complete compression, the die halves 8 and 8A are flush with each other and the mold cavities are aligned.

The molding compound, such as tenite, by means of a plunger (not shown) is forced into the sprue opening 10, in a quantity in excess of that needed to fill the cavities and passages. The molten compound is thus forced through the runners 12 and 12A and gates 11 and 11A into the die cavities and around the cores.

After the die cavities have been filled, the plastic is allowed to cool for a short time in the relatively cool mold (approximately a minute and a half), until the compound hardens. The die halves 8 and 8A are then retracted a distance enough to allow manual access to the molded handset. In this position the half of the cores forming the interior of the transmitter and receiver shell in mold halves 9 and 9A remain in their extended position within their respective cavities. The air pressure in the air cylinders is released by manual operation, to thus retract the retractor assemblies. During this retraction the retractor slides 19 and 19A will slide along their respective beveled edges of plates 20 and 20A; the inverted C-shaped plates 24 and 24A will move outward horizontally (in the direction of their respective arrows A); and the cylinder rods, such as 34, will slide into their bearings, such as 33. Due to the enveloping of the handle portion of the molded handset about the cores 15, 15', 15A and 15A', the plates will remain therein during the retraction, because due to the flats and grooves arrangement, the cores 13, 13A, 14, and 14A will simply slide out during retraction. The die halves 8 and 8A are then retracted the full distance and the knockout pins 38 are effective to force the retractor assemblies away from the molds 9 and 9A.

The molded handsets supported in an upright position in the cavities of molds 9 and 9A and by the excess sprue material in the runners, are then manually seized by the operator, breaking off the sprue material at the gates in the process. The excess material left in the sprue and runners could have been removed first and thus, breaking off this material at the gates before removing the molded handset. After removing the handsets from the mold cavities of molds 9 and 9A, the handsets are merely tapped on a hard surface, whereby the tapered cores 15, 15', 15A and 15A' will simply fall out through the receiver and transmitter openings provided by their respective cores.

A finished telephone handset produced in accordance with the invention is shown in Fig. 5. It comprises a handle 16C, receiver shell or casing 18C and transmitter shell or casing 17C. Extending through the handle is a passage (not shown) through which wires may be drawn to connect the receiver to a telephone cord which enters at a hole 27, drilled out at the location the burr was left at the transmitter shell 17C after the molding operation.

The casings 17C and 18C are large enough to house transmitter and receiver parts. The casings 17C and 18C have threads 30C and 31C formed thereon upon which transmitter and receiver caps (not shown) may be screwed.

Variations may be made in the method and in the construction of the molding means without departing from the scope of the appended claims. It is to be understood that a similar means of molding this telephone handset could be accomplished by transfer molding.

Having described my invention, what I claim is:

1. A mold for molding a telephone handset comprising a first and second die member, each of said die members being shaped to form the side halves of said set and, when mated, cavities comprising handle forming portions and portions for forming receiver and transmitter casings, cores for forming the inner portions of said casings, a pair of tapered cores for forming the inner portions of said handle forming portions, a pressure controlled retractor assembly attached to said first cores, means for pressurizing said retractor assembly to insert said first cores into said casing forming portions, slidable means thereafter manually effective to slidably 'mount said tapered cores on said first cores, passage means for delivering a compound in a plastic state under pressure into said cavity to form integrally and simultaneously the handle and casings of said telephone set in said die, said first means thereafter operated to release said pressure of said retractor assembly to simultaneously retract said first cores from said tapered cores and from said casing forming portions.

2. A mold assembly for molding a telephone handset comprising a first and second die member, each of said die members being shaped to form the side halves of said set and, when mated, cavities comprising handle forming portions and portions for forming receiver and transmitter casings, cores for forming the inner portions of said casings, a pair of tapered cores for forming the inner portions of said handle forming portions, a pressure controlled retractor assembly attached to said first cores, means for pressurizing said retractor assembly to insert said first cores into said casing forming portions, means for slidably mounting said tapered cores onto said corresponding first cores, passage means for delivering a compound in a plastic state under pressure into said cavities to form integrally and simultaneously the handle and casings of said telephone set in said die, said first means thereafter operated to release said pressure of said retractor assembly to simultaneously retract said first cores from said tapered cores and from said casing forming portions whereby said tapered cores remain within said handle casing, said tapered cores thereafter caused to fall out of the receiver and transmitter openings provided by the retraction of said first cores and by tapping each end of the handset.

3. A mold for molding a telephone handset comprising a first and second die member, each of said die members being shaped to form the side halves of said set and, when mated, forming cavities comprising handle forming portions and portions for forming receiver and transmitter casings, cores for forming the inner portions of said receiver and transmitter casings, a pair of tapered cores for forming the inner portions of said handle forming portions, a two directional moving retractor assembly attached to said first cores, said retractor assembly having a normal position, means for pressurizing said retractor assembly to move it in one direction to move said first cores adjacent said casing forming portions, slidable means thereafter manually effective to cause said tapered cores to be slidably mounted on said corresponding first cores, said retractor assembly moved in a second direction upon mating of said die members causing said cores to be inserted within their associated cavities, passage means for delivering a compound in a plastic state under pressure into said cavity to form integrally and simultaneously the handle and casings of said telephone set in said die, said first means thereafter manually operated to release said pressure of said retractor assembly to simultaneously retract said first cores from said tapered cores and from said casing forming portions, and means automatically operated upon parting the die members to move said retractor assembly from its second direction and into said normal position.

4. A mold for a telephone handset comprising a first and second die member, each of said die members being shaped to form the side halves of said set and, when mated, forming cavities comprising handle forming portions and portions for forming receiver and transmitter casings, cores for forming the inner portions of said casings, a pair of tapered cores for forming the inner portions of said handle casing, slidable means manually effective to interlock respective ones of said tapered cores to each end of corresponding ones of said first cores, a retractor assembly including a two inclined sided stationary plate and a pair of sliding members, each sliding member attached to one of the other ends of said first cores, pressure means for maintaining said first cores in said casings and maintaining said sliding members at a certain end of said inclined plate, passage means for delivering a compound in a plastic state to form integrally and simultaneously the handle and casings of said telephone set in said die, means thereafter operated to release said pressure means to simultaneously retract said first cores from said casings and slide said sliding members to the opposite ends of said inclined plates, said retraction simultaneously causing said slidable means to disengage said first cores from said tapered cores.

5. A mold assembly for molding a telephone handset comprising a first and second die member, each of said die members being shaped to form the side halves of said set and, when mated, forming cavities comprising handle forming portions and portions for forming receiver and transmitter casings, a two direction slidably controlled retractor assembly including a pair of cores, said cores for forming the inner portions of said casings, a pair of tapered cores for forming the inner portions of said handle portion, slidable means for sliding each of said tapered cores on one of said first cores when said retractor assembly is slid in one direction, passage means for delivering a compound in a plastic state under pressure into said cavity to form integrally and simultaneously the handle and casings of said telephone set in said die, said slidable means permitting said first cores to be disengaging from said tapered cores when said retractor assembly including said first pair of cores slid in a second direction causing said tapered cores to remain within said handle portion of said telephone set, said tapered cores being removable from said handle portion by tapping the ends of the casings.

6. In a mold for molding a telephone handset as claimed in claim 5, wherein said passage means comprises only a single sprue for delivering said compound into said mold at the outer extremity of said transmitter cavity portion, and all said single sprue connections being removed from said transmitter cavity portion after removal of the handset from the mold to provide an opening for a telephone cord and to eliminate any sprue grinding operations.

References Cited in the file of this patent

UNITED STATES PATENTS

| | | |
|---|---|---|
| 2,309,729 | Gordon | Feb. 2, 1943 |
| 2,436,065 | Dewey, Jr. | Feb. 17, 1948 |
| 2,613,395 | Massler | Oct. 14, 1952 |
| 2,624,071 | Strahm | Jan. 6, 1953 |
| 2,698,460 | Amo | Jan. 4, 1955 |